(No Model.)
T. A. EDISON.
DYNAMO ELECTRIC MACHINE.
No. 304,083. Patented Aug. 26, 1884.
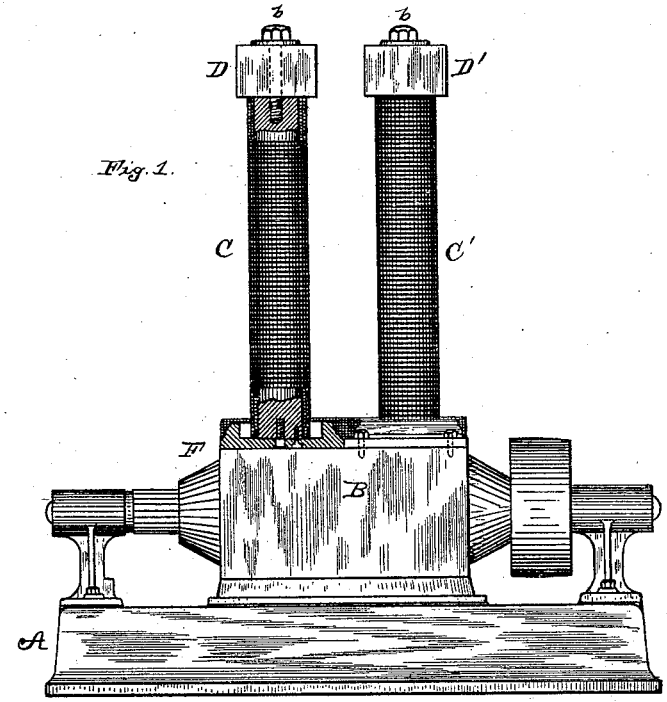
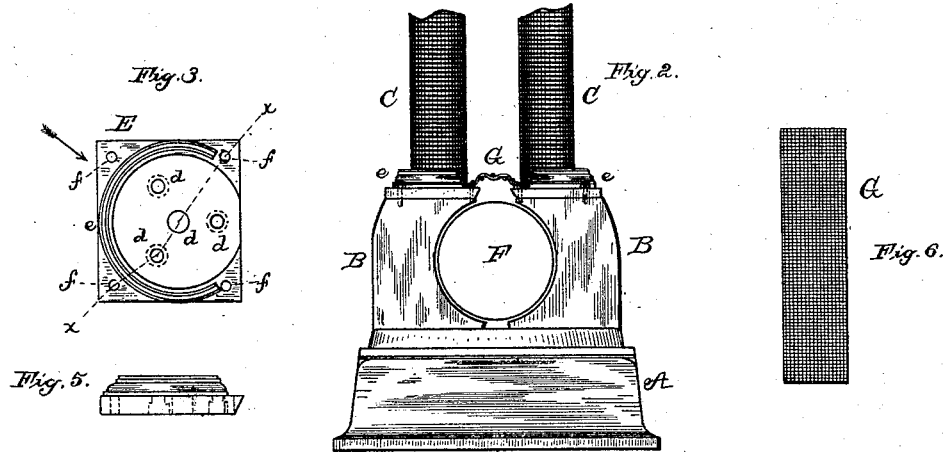
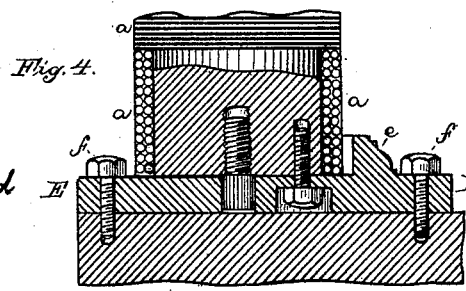
ATTEST:
E. C. Rowland
H. W. Seely
INVENTOR:
Thomas A. Edison
By Rich'd N. Dyer,
Atty

UNITED STATES PATENT OFFICE.

THOMAS A. EDISON, OF MENLO PARK, NEW JERSEY.

DYNAMO-ELECTRIC MACHINE.

SPECIFICATION forming part of Letters Patent No. 304,083, dated August 26, 1884.

Application filed October 10, 1883. (No model.)

*To all whom it may concern:*

Be it known that I, THOMAS A. EDISON, of Menlo Park, in the county of Middlesex and State of New Jersey, have invented a new and useful Improvement in Dynamo-Electric Machines, (Case No. 586,) of which the following is a specification.

This invention relates, mainly, to the field-magnets of dynamo-electric machines, my object being to so construct such magnets that any core may be removed from its place without affecting the other cores.

Another part of the invention relates to the protection of the armature of an upright machine from dust and other substances which might fall upon it from above. The first object is attained by attaching each core removably to its polar extension in the manner to be presently set forth, or to the polar extension common to it and other cores, and to the yoke or back piece of the magnet of which such core forms a part; and the second object I accomplish by placing a cover of wire-gauze or other material, which, while it prevents the passage of dust, &c., will allow the circulation of air through it, across the space between the polar extensions over the armature. The cores are removably connected to the yokes or back pieces by bolts (or equivalent removable connecting devices) passing through such yokes into the tops of the cores and held by nuts, which can be unscrewed and the bolts withdrawn, and to connect a core removably to the polar extensions such core is attached to a plate by bolts passing through the bottom of said plate into the end of the core. Such plate is then removably secured to the polar extensions. The plate is preferably provided with an ornamental and protective flange extending up around the bottom of the magnet-core, except on the side toward the armature. The cores being made solid, of wrought-iron, are for cheapness and convenience made of cylindrical form from end to end. The pole-pieces are solid and rest upon a base, and hence the bolts for securing the cores to the pole-pieces could not well be passed entirely through them. The intermediate plates, which are preferably of cast-iron, are therefore used for securing the cores and pole-pieces together. These plates, however, do more than simply attach these parts. They form good magnetic joints between them. Before using these plates I experienced some difficulty in fitting the surfaces of the heavy cores and pole-pieces directly together so that there would be large surface-contact and good magnetic conductivity; but the comparatively light plates can be well fitted to the surfaces so as to make a good magnetic joint between them, and this can be done at less expense than the direct fitting of the cores and pole-pieces. The wire-gauze cover which extends across the space between the extensions may be secured to these plates.

In the accompanying drawings, Figure 1 is a side elevation of a dynamo-electric machine with the two ends of one of the magnet-cores in section; Fig. 2, an end view of the machine with the details of the armature omitted; Fig. 3, a plan view of one of the plates which are secured to the polar extensions; Fig. 4, a section of the lower part of a magnet-core, taken on the dotted line $x\ x$ of Fig. 3, looking from the direction indicated by the arrow; Fig. 5, an elevation of one of the flanged plates, and Fig. 6 a view of the wire-gauze cover of the armature.

A is the bed-plate on which the machine is mounted. B B are the polar extensions of the machine, from each of which rise two magnet-cores, C and C', which are wound with wire coils $a$ and form the field electro-magnets. The yokes or back pieces, D D, connect the two magnet-cores C together and the two cores C' together, respectively. The yoke D is secured to the magnet-core C by a bolt, $b$, passing through the yoke into the end of the core and secured by the nut $c$. All the other cores C and C' are attached to the yoke in the same manner. The lower end of each core C is secured by bolts $d\ d$ to a plate, E, such plate being of greater area than the core, and having a flange, $e$, which extends up around the lower part of the core, except on the side toward the armature F. Each plate E is secured to the polar extension by bolts $f\ f$. A screen, G, preferably of wire-gauze, is placed over the space $g$ between the polar extensions and fastened at both sides. This prevents dust, &c., from falling upon the armature, while it does not hinder the passage of air through the space.

It is evident that by removing the necessary nuts and bolts any core may be removed from its place without affecting the other cores when it is desired to rewind a core on account of a cross in the wire, or for any other purpose, it being of course much more convenient to work on the core when it is detached from the rest of the machine.

What I claim is—

1. In a dynamo-electric machine, the combination, with the pole-pieces, of the magnet-cores and intermediate plates, secured both to said pole-pieces and such cores for removably attaching them together and forming good magnetic joints between them, substantially as set forth.

2. The combination, with a dynamo-electric machine having a vertically-placed field magnet or magnets, of a screen covering the space above the armature between the polar extensions of said magnet or magnets, substantially as set forth.

3. The combination, with a dynamo-electric machine having a vertically-placed field magnet or magnets, of a wire-gauze screen covering the space above the armature between the polar extensions of said magnet or magnets, substantially as set forth.

This specification signed and witnessed this 27th day of July, 1883.

THOS. A. EDISON.

Witnesses:
H. W. SEELY,
EDWARD H. PYATT.